United States Patent [19]

Yoshikawa et al.

[11] 4,410,252

[45] Oct. 18, 1983

[54] SINGLE LENS REFLEX CAMERA

[75] Inventors: Ryoichi Yoshikawa, Yokohama; Yoshihiro Shigeta, Tokyo; Masanori Uchidoi, Yokohama; Yoichi Tosaka, Shakujii; Shosuke Haraguchi, Yokohama, all of Japan

[73] Assignee: Canon Kabushiki Kaisha, Tokyo, Japan

[21] Appl. No.: 295,326

[22] Filed: Aug. 24, 1981

[30] Foreign Application Priority Data

Aug. 28, 1980 [JP] Japan .............................. 55-118618

[51] Int. Cl.³ .......................... G03B 1/18; G03B 19/12
[52] U.S. Cl. ...................................... 354/153; 354/173
[58] Field of Search ............... 354/152, 153, 171, 173, 354/271

[56] References Cited

U.S. PATENT DOCUMENTS 3,672,281 6/1972 Land ................................... 354/152
4,204,759 5/1980 Yamada et al. ..................... 354/173
4,313,658 2/1982 Sugiura et al. ..................... 354/152

Primary Examiner—William B. Perkey
Attorney, Agent, or Firm—Toren, McGeady and Stanger

[57] ABSTRACT

A single lens reflex camera with a built-in winding motor performing quick return of the mirror and automatic diaphragm in the initial stage of winding operation where the load on the winding motor is very little is disclosed.

5 Claims, 8 Drawing Figures

SINGLE LENS REFLEX CAMERA

BACKGROUND OF THE INVENTION

Field of the Invention

This invention relates to motorized single lens reflex cameras.

In conventional single lens reflex cameras, the quick return of the mirror and diaphragm and the release of the winding lock are carried out in association with the termination of a closing operation of the trailing blade. However, in winding, the shutter drive spring must be charged with energy necessary for urging the shutter as well as with energy necessary for the release. Therefore, it is necessary that the shutter drive spring have a strong biasing force.

SUMMARY OF THE INVENTION

An object of the invention is to provide a single lens reflex camera free from the necessity of strengthening the biasing force of the shutter drive spring and the necessity of increasing the driving force of the winding motor.

Another object of the invention is to provide a single lens reflex camera which consumes little electrical energy.

DESCRIPTION OF THE PREFERRED EMBODIMENT

Figure 1A:
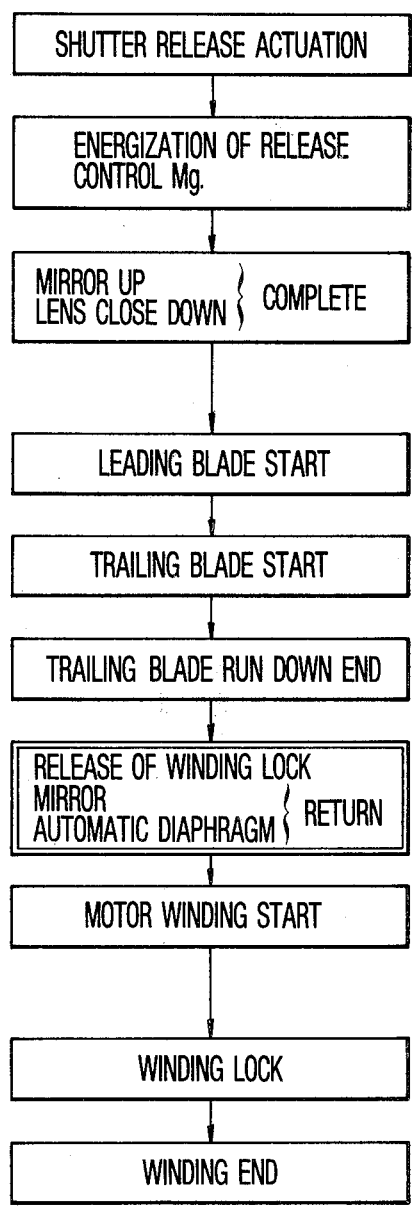
FIG. 1 is a block diagram illustrating a sequence of operation of a single lens reflex camera with FIG. 1(a), according to the prior art, and FIG. 1(b), according to an embodiment of the present invention.
Figure 1B:
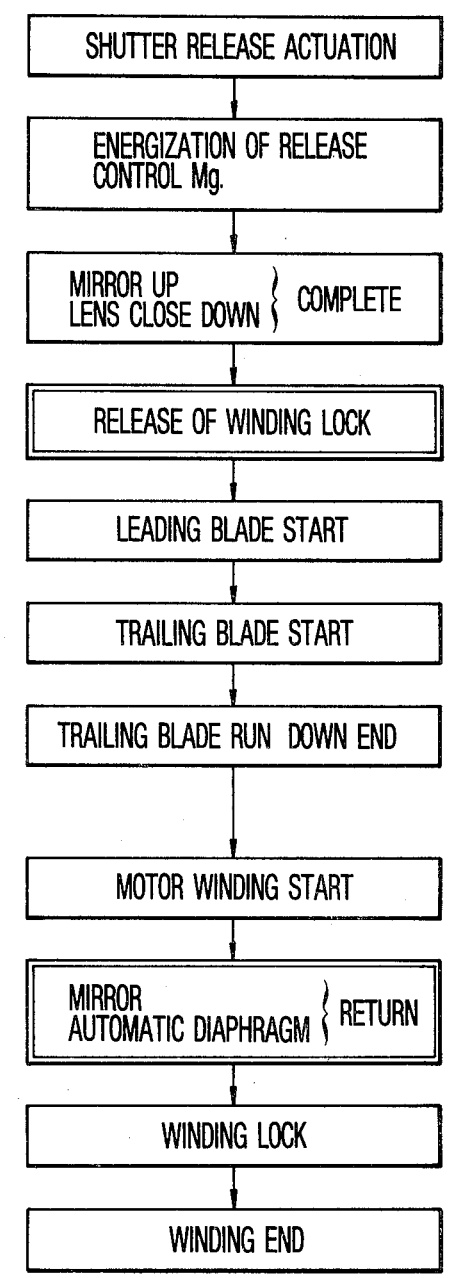

FIG. 1 illustrates the comparison of the sequences of the conventional single lens reflex camera which is indicated at (a) and the single lens reflex camera of the invention which is indicated at (b). In the prior art, the release of the winding lock and the return of the mirror and automatic diaphragm (indicated in a doubled line enclosed block) are simultaneously carried out by a signal, indicative of the end of movement of the trailing blades of the shutter. In the present invention, the release of the winding lock is carried out by a signal indicative of the mirror-up, and the return of the mirror and automatic diaphragm occur in the early stage of a motor winding operation.

Figure 2:
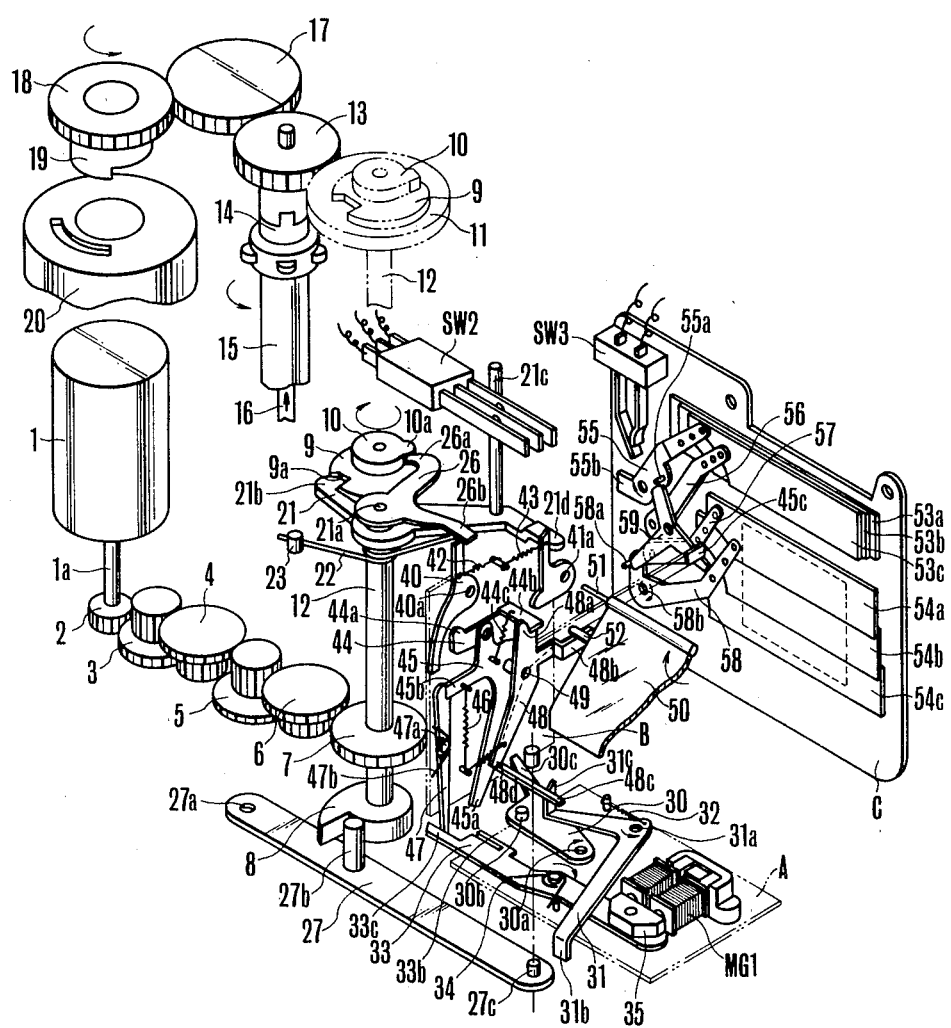
FIG. 2 is an exploded perspective view of the main parts of the mechanism in the camera in accordance with the invention.

FIG. 2 illustrates the structure of the camera employing one form of the present invention. In the drawing, 1 is a winding motor; 2 is a pinion affixed to the output shaft 1a of the motor 1. The two-stage gears 3, 4, 5 and 6 constitute a speed reduction gear train; a gear 7 is fixedly mounted on a shaft 12. At the bottom end of the shaft 12 is fixedly mounted a charge cam 8, and at the top end are fixedly mounted a winding detent disc 9, a mirror return control cam 10 and a gear 11. A sprocket gear 13 meshes with the gear 11 and drives a sprocket 15 through a clutch 14 in a manner known in the art. A sprocket shaft is identified with the numeral 16. When a known R button is depressed, the sprocket shaft 16 is moved upward, a direction indicated by an arrow to disengage a clutch 14. An idler gear 17 and a spool gear 18 are connected through a spool friction metal 19 to a takeup spool 20.

Figure 3:
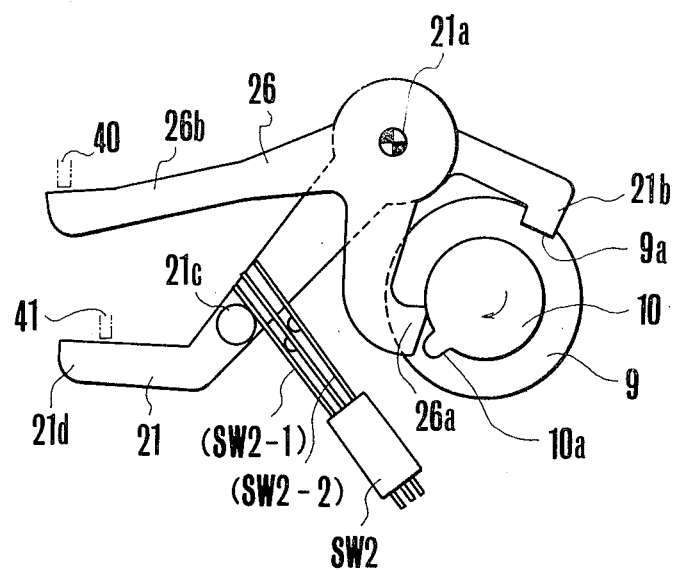
FIGS. 3 and 4 are plan views of the mirror reset lever in two different operative positions.
Figure 4:
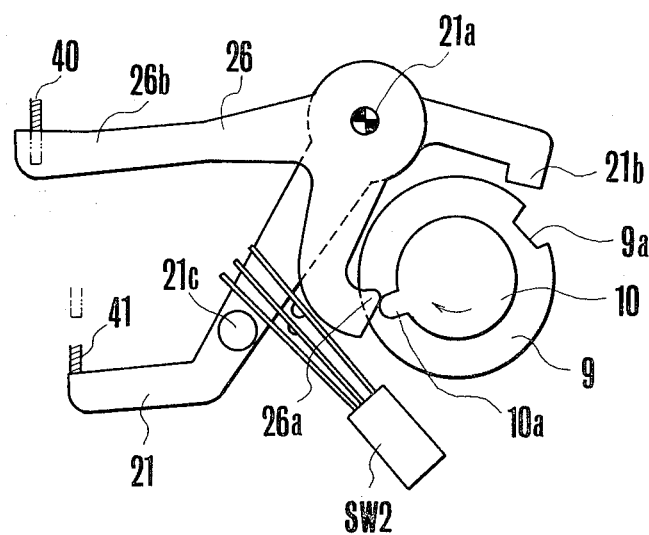

Referring now also to FIGS. 3 and 4, a winding lock lever 21 is pivoted at a pin 21a with one arm having a pawl 21 for engagement in a cutout portion 9a of the winding detent disc 9. Its other arm has a pin 21c extending therefrom to open and close a switch SW2. A spring 22 urges the lever 21 in such a direction that the pawl 21b abuts on the winding detent disc 9. When each cycle of the winding operation is completed, the pawl 21b drops in the cutout 9a, as shown in FIG. 3.

A mirror return control lever 26 is pivotally mounted on the common pin of the winding stop lever 21. When in the wound position, as shown in FIG. 3, one end 26a engages with a projected portion 10a of a mirror return control cam 10, and the opposite end 26b engages with an upper arm of a release lever 40. A spring 42 urges the lever 26 to turn in a counterclockwise direction.

A charge response lever 27 is rotatable about a shaft 27a. On the charge response lever 27 are disposed a pin 27b for engagement with the above-described cam 8 and a pin 27c for engagement with a charge lever 30.

A indicates an automatic diaphragm unit. The charge lever 30 is pivotally mounted at a pin 30a on a unit base plate A with its free end engaging the pin 27c on the charge lever 27. A diaphragm closing down lever 31 is pivotally mounted on a pin 31a and has a bent portion 31 for engagement with a closing down member of a lens (not shown) and a rising portion 31c for engagement with a mirror drive lever 48.

The closing down lever has a return spring 32.

A start lever 33 is rotatable about a pivot pin 33a supporting an armature 35 to be attracted to a permanent magnet with an electromagnet MG1 at one arm thereof, the opposite arm of which is provided with an engagement portion 33b for the pin 30b on the above-described charge response lever 27 and an engagement portion 33c for a latching lever 47. A spring 34 urges the start lever 33 in a clockwise direction.

A drive unit B for a reflex mirror 50, when in a viewing position, directs light from an object to be photographed to an optical finder system (not shown). 45 is a spring-powered lever and 48 is a mirror drive lever. These levers are identified with the numerals 45, 48, respectively, and are pivotally mounted on a common pin 49. Pivotally mounted on the spring-powered lever 45 is an interconnection lever 44 provided with an engagement portion 44b for the end portion 48a of the mirror driver lever.

A spring 44c urges the interconnection lever 44 toward the engagement.

A latching lever 47 is rotatable about a shaft 47a and is urged by a spring 47b to turn in a clockwise direction so that the upper end portion engages with one arm 45b of the spring-powered lever 45, and the lower end portion engages with the start lever 33. A main spring 46 is tensioned between the spring-powered lever 45 and a pin on the unit base plate A. The mirror drive lever 48 has a mirror flip upward arm 48b to engage with a pin 52 of the mirror and an arm 48c to engage with an upward extension 31 of a diaphragm closing down lever, and is urged by a return spring 48d to turn in a clockwise direction. When the main spring 46 is in the charged stage, the mirror drive lever 48 engages the interconnection lever 44, and is latched along with the spring-powered lever 45 by the lever 47 in the illustrated position.

A release lever 40 is pivotally mounted at a pin 40a on the unit base plate and is urged by a spring 42 so that the upper end engages the arm 26a of the mirror return lever and the lower arm is engageable with the end portion 44a of the interconnection lever. A mirror up signal lever 41 is pivotal at a pin 41a and urged by a spring 43 in such a direction that the lower arm engages with a pin 52 on the mirror, and the upper arm is engageable with the end portion 21d of the winding stop lever 21.

A shutter unit is identified by the letter C. Trailing blades 53a, 53b and 53c are movably mounted on arms 55 and 56. The arm 55 is urged by a drive spring (not shown) in a direction in which the shutter runs down, and is latched by a lever in the charged position. The leading blades of the shutter 54a, 54b and 54c are movably mounted on arms 57 and 58 and latched by a lever (not shown) in an exposure aperture covering position. A shutter charge lever 59 is pivotal at a pin 59a and provided with three arms to engage with a pin 55a on the trailing blade arm 55, a pin 58a on the leading blade arm 58 and one arm 45c of the spring-powered lever 45, respectively. The shutter charge lever 59 is urged to turn in a counterclockwise direction by a spring (not shown).

A trailing blade run down complete signal switch is identified as SW3.

Figure 5:
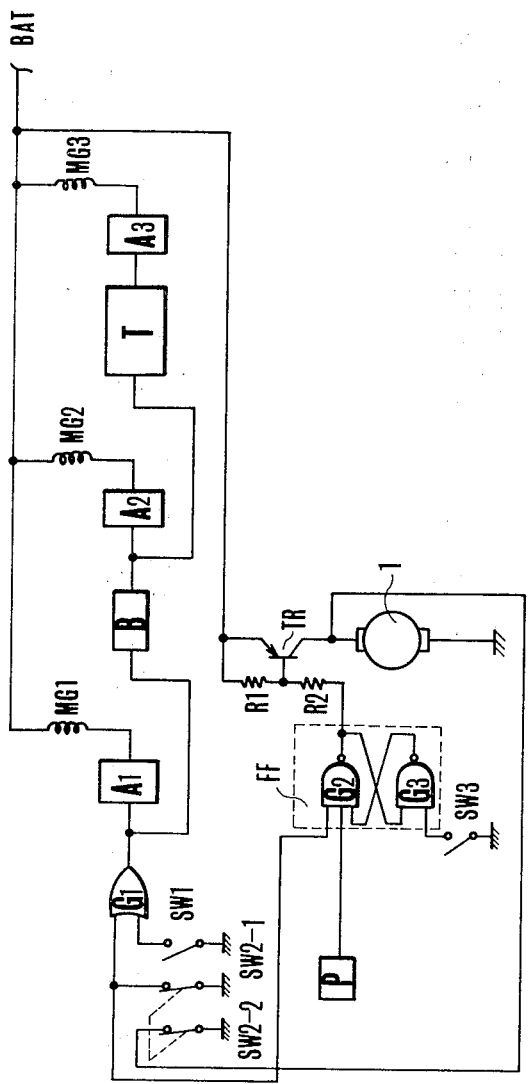
FIG. 5 is a diagram of a motor control circuit.

FIG. 5 shows a motor control circuit. A switch SW1 is arranged to be turned on when a shutter button 20 is pushed, and switches SW2-1 and SW2-2 cooperate with a pin 21c of the winding stop lever, the SW2-1 being connected to one terminal of an OR gate and SW2-2 being connected to a motor 1 to short-circuit the motor 1 when turned on. The trailing blade run down complete signal SW3 is turned on when running down of the trailing blades is completed, and turned off during the winding operation. The apparatus includes a release electromagnet MG1, a leading blade control electromagnet MG2 and a trailing blade control electromagnet MG3.

The mono-stable circuits A1–A3 produce driving pulses for the electromagnets MG1-MG3, a timer B and a shutter time determining circuit T. An OR gate G1, NAND circuits G2 and G3 constitute a flip-flop FF; an initial reset circuit P resets the flip-flop FF when an electrical power source is thrown; resistors are identified as R1 and R2; and a motor control transistor is TR.

Figure 6:
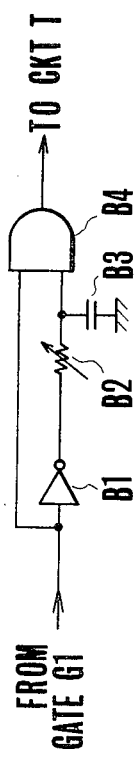
FIGS. 6 and 7 are electrical circuit diagrams showing the details of the timer B and shutter time determining circuit T of FIG. 5.

FIG. 6 is an electrical circuit diagram which illustrates the details of the timer B of FIG. 5. An inverter B1 is connected to the output of gate G1, the output of the inverter B1 being connected through a variable resistor B2 to an input terminal of an AND gate B4. The resistor B2 is a resistor for adjusting a delay time and forms a time constant member together with a capacitor B3. The AND gate B4 has the input terminal which is connected to the resistor B2 and an input terminal which is connected to the output of the gate G1, and has an output which is connected to the circuit T.

Figure 7:
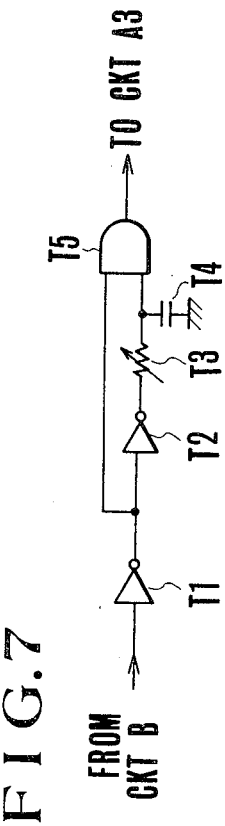

FIG. 7 is an electrical circuit diagram which illustrates the details of the shutter time determining circuit T. An inverter T2 is connected through an inverter T1 to the output terminal of the circuit B or the output terminal of the AND gate B4 of FIG. 6, the output terminal of the inverter T2 is connected through a resistor T3 to an AND gate T5 at one input terminal thereof. The resistor T3 is a variable resistor whose resistance value is adjusted in accordance with the selected shutter time and forms a time constant member together with a capacitor T4. The AND gate T5 has a first input terminal which is connected to the inverter T1, and a second input terminal which is connected to the inverter T1, and has an output terminal which is connected to the input terminal of the circuit A3.

In operating such a camera, a main switch (not shown) is closed to supply the circuitry with current from the battery. When a shutter button (not shown) is depressed, the switch SW1 is closed. Since at this time the switches SW2-1 and SW2-2 are ON, the output of the OR gate G1 is then changed from high to low level. This change triggers the mono-stable circuit A1, supplying the coil of the release electromagnet MG1 with current for a predetermined time. Since the energized coil produces a magnetic flux of opposite polarity to that of the magnetic flux of the permanent magnet, the armature 35 is then moved away from the permanent magnet, as the start lever 33 is turned in the direction indicated by an arrow under the action of the spring 34, and its left hand end 33c strikes the latching lever 47 at the tail thereof. Then the latching lever is turned about the pivot pin 47a in the counterclockwise direction against the force of the spring 47b. Therefore, the spring-powered lever 45 is released from the latching connection to turn about pivot pin 49 in the counterclockwise direction under the action of the drive spring, while carrying the interconnection lever 44 and the mirror drive lever 48. The mirror drive lever 48 uses its arm 48b in lifting the pin 52, causing the mirror 50 to be turned about the shaft 51 in the direction indicated by the arrow to the non-viewing position and uses its bent-off portion 48c in pushing the upward bent-off portion 31c of the diaphragm closing down lever 31. Therefore, the lever 31 is turned about the pivot pin 31a in the clockwise direction against the force of the spring 32, while the downwardly bent-off portion 31b on the other arm pushes a diaphragm closing down member (not shown) in the lens mounting until the size of aperture opening is adjusted to the presetting. Another arm 45c of the spring-powered lever 45 withdraws from the shutter charge lever 59 at one arm thereof, thereby the other two arms are retracted from the ranges of movement of the pins 55a and 58a on the shutter arms.

When the mirror 50 nears the terminal end of upward movement, the pin 52 pushes the mirror-up signal lever 41 at the lower arm portion thereof upward, and the lever 41 is turned about the pivot pin 41a in the clockwise direction while its upper arm portion, in engagement with the tail 21d of the winding stop lever 21 drives the lever 21 to turn about the pivot pin 21b in the counterclockwise direction. This disengages the pawled portion 21b from the detent recess 9a or releases the winding control disc 9 from the locking connection with the winding stop lever 21. At the same time, the switches SW2-1 and SW2-2, which have so far been ON as they are pushed by the pin 21c, are turned off. Then the OR gate G1 changes its output from low to high level, at which the timer B starts to operate. After the elapse of a pre-adjusted time slightly longer than the time necessary to perform the above-described release of winding lock, the output of the timer B changes from high to low level.

This output change triggers the mon-stable circuit A2 to energize the electromagnetic MG2 controlling the opening operation of the leading blades of the shutter. Such energization of the electromagnet MG2 causes a latching lever (not shown) to be disengaged from the arm 58 carrying the leading blades. Then the arm 58 is turned about the pivot pin 58b by the force of the spring in a direction indicated by an arrow, thereby the leading blades 54a, 54b and 54c run down to initiate an exposure.

Such a change in the output of the timer B from low to high level also causes the start of operation of the shutter time determining circuit T. Then, at the termination of duration of the preset exposure time, the output of the circuit T is changed from high to low level. This output change triggers the mono-stable circuit A3 to energize the electromagnet MG3. Then, a latching lever (not shown) is disengaged from the arm 55, and the arm 55 is turned in the clockwise direction, thereby the trailing blades 53a, 53b and 53c run down to terminate the exposure. Just before the terminal end of the running down movement of the trailing blades, the switch SW3 is turned on by the other arm 55b of the lever 55.

The switch SW3 produces a signal which is applied to the NAND gate G3, and the flip-flop FF consisting of the G2 and G3 is reset with the change of output (the output of G2) from high to low level.

Therefore, a base current flows through the resistor R2 to the transistor TR and the transistor TR is turned on.

Then, current supply to the motor 1 starts, and a winding operation by the motor is initiated.

In the early stage of rotational operation of the motor 1, the following operation is carried out. Motion produced by the motor 1 is transmitted through the gears 2 to 7 to the cam shaft 12 to drive the cam 8. The force is also transmitted through the gears 11, 13, 17 and 18 to the sprocket 15 and the spool 20.

Since the winding lock is released in response to the mirror being up at the same time when the motor 1 starts to rotate, the mirror return control cam 10 also starts to rotate in the direction indicated by an arrow. Then, as shown in FIG. 4, the projected portion 10a, while slidingly engaging the slant surface 26a of the end portion of the lever 26, turns the lever 26 about the pivot pin 21a in the clockwise direction. Therefore, the other end 26b of the lever 26 pushes the release lever 40 at the top to cause it to turn counterclockwise against the spring 42, and the lower arm portion pushes the interconnection lever 44 at one end 44a to cause it to turn counterclockwise against the spring 44c, thereby the opposite end 44b is disengaged from the mirror drive lever 48. Then, the mirror drive lever 48 is pulled by the spring 48d to turn about the pin 49 in a clockwise direction. Thus, the reflex mirror 50 and the diaphragm closing down lever 31 return to the initial positions due to the forces of the respective return springs, and the lens is fully opened. Furthermore, the mirror up signal lever 41, which has so far been pushed by the pin 52 of the mirror support, is also returned by the action of the spring 43. Although the winding stop lever 21 is also turned by the spring 22 to abuttingly engage on the winding detent disc 9, as the winding detent disc has already started to rotate, the pawl 21b does not drop into the cutout 9a, thus permitting the winding operation to proceed.

After the mirror return operation and the automatic diaphragm return operation have been completed, the following operation is subsequently carried out. As the winding control cam 8 rotates, gradually pushing the pin 27b, the response lever 27 is turned about the pivot pin 27a in a clockwise direction, while the pin 27c on the opposite end pushes the charge lever 30 at the free end 30c, thereby the lever 30 is turned about the pivot pin 30a in a counterclockwise direction. Such a movement of the lever 30 causes the spring-powered lever 45 to turn about the pivot pin 49 in a clockwise direction in engagement with the end portion 30c with the lower end 45a, thus charging the main spring 46. Another arm 45c of the spring-powered lever 45 is brought into engagement with the arm of the shutter charge lever 59 and the lever 59 is turned about the pivot pin 59a in a clockwise direction. The other two arms are brought into engagement with the pins 58a and 55a, respectively, and turn the arms 58 and 55 in a counterclockwise direction. Thus, the leading and trailing blades are returned to the initial positions, and the driving spring is charged. At this time, the switch SW3 is moved from the ON to the OFF position, but the status of the flip-flop FF remains unchanged. The pin 30b disposed on the charge lever 30 pushes the start lever 33 at the extension 33b to cause it to turn about the pivot pin 33a in a counterclockwise direction. Thereby, the armature 35 on the opposite end is brought into abutting relation with the electromagnet MG1 and is held in the attracted position by the magnetic force of the permanent magnet.

The spring-powered lever 45, when in the terminal end of movement, is engaged at its one arm 45b with the upper arm portion of the latch lever 47 and held in this position, and one arm 44b of the interconnection lever 44 is again engaged with the cutout portion 48a of the mirror drive lever 48.

When the cam shaft 12 rotates one revolution, the transportation of the film through the length of one frame by the sprocket 15 to the takeup spool 20 is completed. At this time, the winding detent disc 9 also takes the initial position as shown in FIG. 3 and the pawl 21b of the winding stop lever drops in the cutout portion 9a. Then, the pin 21c on the lever 21 turns on the switches SW2-1 and SW2-2, thereby the flip-flop FF is reset to render the transistor TR non-conducting, and the motor 1 is de-energized. Furthermore, both ends of the winding of the motor 1 are short-circuited to rapidly stop the motor from further rotation.

The charge response lever 27 is pulled by a spring (not shown) as the pin 27b is suddenly dropped into the stepped-down camming surface of the cam 8. Thus, all the mechanisms in the camera are reset in their initial positions, illustrated in FIG. 2, and one photographic cycle is completed.

In the present invention, the sequence of camera operation is so arranged that when the running down movement of the trailing blades of the shutter is completed, the motor is immediately caused to start movement by an electrical signal and its motion is used in carrying out the quick return of the mirror and automatic diaphragm. Therefore, there is no need to strengthen the shutter drive spring as in the conventional camera, where when the running down movement of the trailing curtain is completed, the quick return is carried out by mechanical response means. Furthermore, since the quick return of the mirror and the quick return of the automatic diaphragm are made to occur in the initial stage of a winding operation when the load on the motor is small, there is no need to particularly increase the driving torque of the motor with the added advantage that the consumption of electrical energy is limited.

What is claimed is:

1. A camera comprising:
   (a) a reflex mirror;
   (b) locking means engaged with said reflex mirror for preventing said reflex mirror from being moved to a viewing position;
   (c) film advance means;
   (d) a film winding motor coupled to said film advance means for actuating the film advance means in response to a termination of an exposure of the camera; and
   (e) coupling means for coupling said motor with said locking means for releasing said locking means in response to an initiation of the movement of said motor.

2. A camera according to claim 1, further comprising:
   (a) diaphragm control means; and
   (b) a return spring engaged with said diaphragm control means for returning the diaphragm control means to an initial position; and
   (c) means connected to said motor to allow said return spring to return said diaphragm control means to its initial position in response to the termination of the exposure of the camera.

3. A single lens reflex camera comprising:
   (a) a reflex mirror;
   (b) biasing means for urging said reflex mirror to a viewing position of said reflex mirror;
   (c) locking means engaged with said reflex mirror for preventing said reflex mirror from being moved to a viewing position;
   (d) film advance means;
   (e) a film winding motor coupled to said film advance means for actuating the film advance means in response to a termination of an exposure of the camera; and
   (f) coupling means for coupling said motor with said locking means for releasing said locking means in response to an initiation of the movement of said motor.

4. A single lens reflex camera according to claim 3, wherein said biasing means includes a return spring.

5. A single lens reflex camera according to claim 4, further comprising:
   (a) diaphragm control means; and
   (b) a return spring engaged with said diaphragm control means for returning the diaphragm control means to an initial position; and
   (c) means connected to said motor to allow said return spring to return said diaphragm control means to its initial position in response to the termination of the exposure of the camera.

* * * * *